Figure 1:
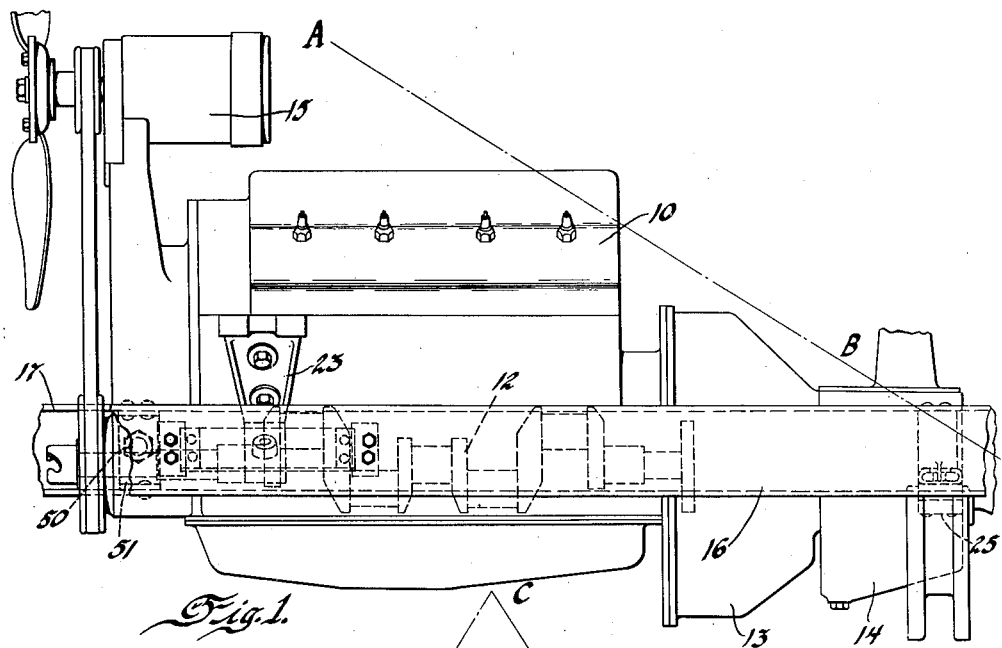

Oct. 3, 1933.  C. E. SUMMERS  1,929,104

MOUNTING FOR V-8 ENGINES

Filed Oct. 18, 1929   2 Sheets-Sheet 1

Inventor
Caleb E. Summers

By Blackmore, Spencer & Flinn
Attorneys

Oct. 3, 1933.  C. E. SUMMERS  1,929,104
MOUNTING FOR V-8 ENGINES
Filed Oct. 18, 1929  2 Sheets-Sheet 2
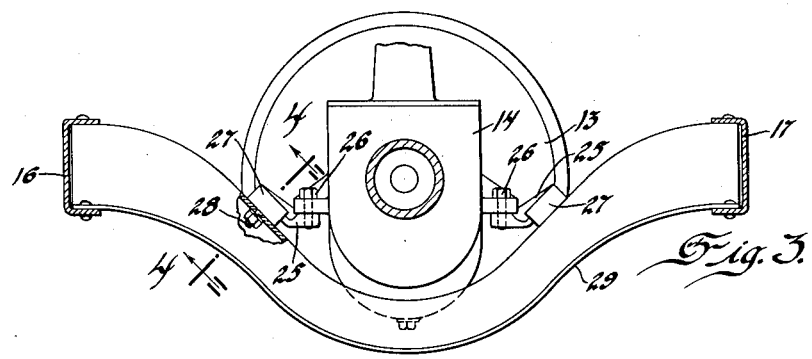
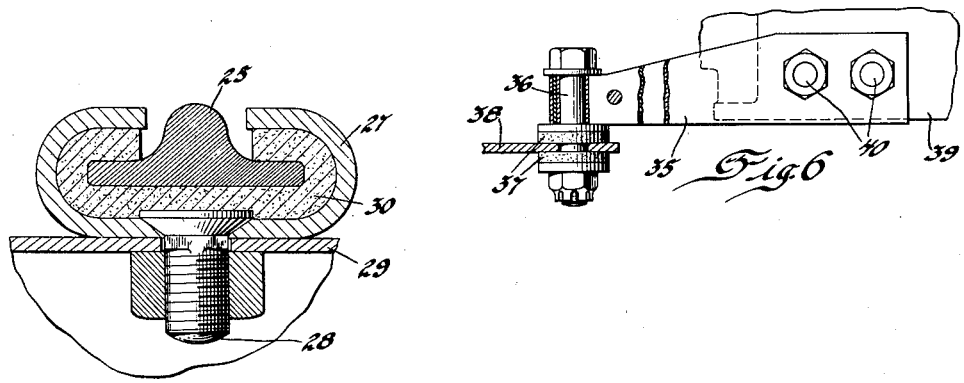
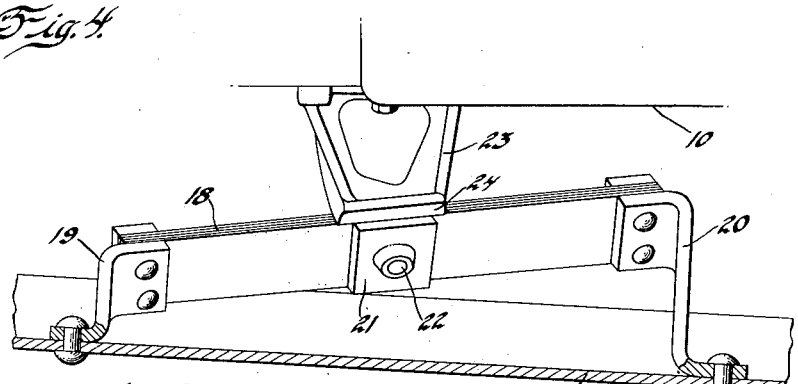
Inventor
Caleb E. Summers Patented Oct. 3, 1933

1,929,104

UNITED STATES PATENT OFFICE 1,929,104

MOUNTING FOR V-8 ENGINES

Caleb E. Summers, Pontiac, Mich., assignor to General Motors Research Corporation, Detroit, Mich., a corporation of Delaware Application October 18, 1929. Serial No. 400,603

11 Claims. (Cl. 123—192)

The invention relates to engine mountings or suspensions and more particularly to those designed for use in connection with engines or other machines of the type in which lateral vibrations about a fixed axis occur as an incident to the normal operation of the machine.

While not in all respects restricted thereto, the invention is of particular utility in connection with, and will be herein described as applied to, internal combustion engines of the eight cylinder V type in which a conventional single-plane or 180° crankshaft is employed. In the most usual arrangement of these V-8 engines the two blocks of cylinders are positioned on opposite sides of, and with the cylinder axes at 45° to, a central vertical plane passing through the axis of the crankshaft. It is customary also to employ a four throw crankshaft having the two end throws or cranks at 180° to the two intermediate cranks, the end cranks being on the opposite side of the axis from the intermediate cranks. The connecting rods of a pair of opposed cylinders are, of course, connected to each crank.

It is well known that with this type of engine the so-called "secondary inertia forces," due to the finite length of the connecting rods, combine to produce forces acting alternately in opposite directions at twice crankshaft frequency in a plane normal to the central vertical plane of the engine. These forces would normally tend to produce vibrations of the engine in the direction of their action, i. e., in a horizontal plane.

Other unbalanced forces inherent to the operation of the engine, for example gas torque reaction, affect to some extent the resultant motion of the engine assembly. Furthermore, it is customary, especially in power plants designed for use in motor vehicles, to mount upon or assemble with the engine frame other relatively heavy parts such as the flywheel, clutch and transmission and their enclosing casings. The distribution of masses in the entire unitary assembly with reference to the line of action of the unbalanced forces therefore causes the resultant vibratory movements to assume a direction not exactly in a horizontal plane but, as I have found, in an arcuate path about a fixed axis.

I have determined by experiment that the axis about which these vibrations or oscillations occur in a typical V-8 engine, such as is herein illustrated, is located adjacent to the top of the engine at the front end but that it is inclined downwardly toward the rear. Advantage is taken of this discovery by so arranging the engine supports as to permit the engine assembly to swing comparatively freely in the path in which it tends to vibrate, thereby avoiding to a great extent the transmission of the energy of the vibrations to the supporting frame. One purpose of the invention, therefore, is to provide a system of supports for an engine or like mechanism subject to oscillations about a fixed axis whereby substantial freedom of oscillation is permitted.

When used as the power plant of a motor vehicle the engine assembly is also subject to occasional or non-periodic forces due to movement of the vehicle frame tending to cause swaying or like movements. Accordingly it is desirable to provide means for restricting the free movement of the engine assembly to that necessary to accommodate the periodic oscillatory movements. I, therefore, employ as a part of the engine mounting a brace or connection between the engine assembly and the supporting frame designed to prevent undesirable relative swaying movement while permitting the free travel of the assembly in the path of its lateral vibrations.

Figure 2:
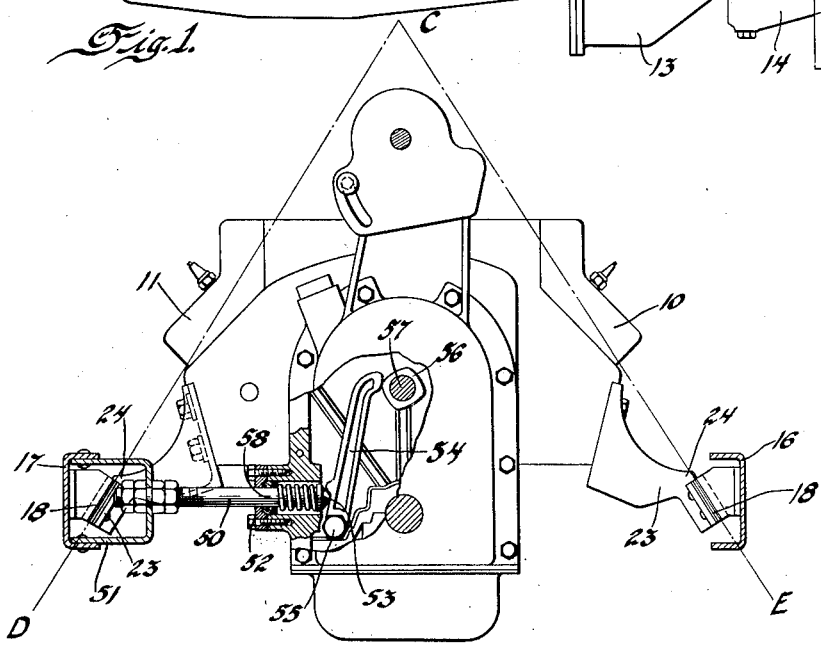

In the accompanying drawings, Fig. 1 is a side elevation of a V-8 engine assembly to which one embodiment of the invention is applied; Fig. 2 is an end elevation of the front of the engine showing parts in section; Fig. 3 is an end elevation looking at the assembly from the right of Fig. 1; Fig. 4 is a detail section on line 4—4 of Fig. 3; Fig. 5 is a plan view of one of the engine supporting devices and Fig. 6 is a detail view of a modified form of support.

Referring to the drawings, I have shown in Figs. 1 and 2 an engine assembly of the type ordinarily employed as a power plant for a motor vehicle. It comprises two blocks, 10 and 11, each having four cylinders, the axes of the cylinders of the two blocks being at 90° to each other. A conventional four-throw crankshaft is indicated at 12, the intermediate cranks being at 180° to, and on the opposite side of the axis from, the two end cranks. The other internal parts of the engine are not illustrated as they are also conventional so far as concerns the present invention. The assembly also includes the flywheel and clutch housing 13 and the transmission casing 14, the mechanisms in which may be of any usual or desired character, also other accessories, such as the generator and fan assembly 15.

In a power plant assembly substantially as illustrated I have found that the lateral vibrations due to the secondary inertia forces and other unbalanced forces take the form of oscillations about an axis which may be termed the neutral axis and which assumes approximately the position indicated by the broken line A B. The amplitude of the vibratory movements, of course, will increase with the distance of the part from this axis, parts in or near the axis having practically no perceptible movement. If the engine assembly, therefore, be supported in such manner as to permit relatively free swinging movement in an arc approximately about the neutral axis, particularly at points of support most remote from this axis, the transmission of the energy of the vibrations to the supporting frame may be eliminated or materially reduced.

In the construction illustrated, the power plant is positioned between side frame members 16, 17, which may be the usual side channel members of an automobile chassis frame. In Figs. 1, 3 and 5 I have shown a form of mounting device for connecting the engine frame to the side frame members adapted particularly for use at the front end of the engine assembly. This device comprises a flat link or bar 18 of laterally resilient material, as, for example a composite bar of laminated spring metal plates. The link or bar is rigidly secured at its ends to brackets 19, 20, carried by the channel frame members. At an intermediate point in the length of the bar it is secured, as by clamp plate 21 and bolt 22, to a horn or arm 23 extending laterally from the engine frame or body near the front thereof. This horn is provided with a flange 24 adapted to rest upon the upper edge of the link 18 to insure adequate support of the weight of the engine on the link.

The brackets 19, 20, and the horns 23 are so shaped and positioned that each of the links 18 lies in a plane containing the neutral axis A B, as indicated by the lines C D, C E, on Fig. 2. The rigidity of the links in the direction of their length and width is such that they permit substantially no movement of the engine in such direction. They are sufficiently flexible, however, in the direction of their thickness, i. e., in a direction normal to the plane containing the neutral axis, to permit practically free swinging movement of the engine about that axis to the extent of the amplitude of the inherent lateral vibrations.

In Fig. 6 is illustrated a modified form of resilient link which has been found suitable for use as front supports. This link 35 comprises a plurality of flat spring bars bent in a loop to form an eye at the front end to fit about a pin 36 mounted with interposed resilient washers 37 upon a cross frame member 38 at the front of the engine. The rear end of the loop is secured to the engine body 39, as by bolts 40, so that the link lies in a substantially vertical plane and extends forwardly from the engine. While the link is not yielding vertically or endwise it is sufficiently resilient laterally to permit substantially free lateral movement due to inherent lateral vibration of the engine.

At the rear of the engine assembly and at a point or points as close as may be convenient to the neutral axis I provide additional supporting means. As illustrated, this comprises arms 25 mounted rigidly upon the transmission casing 14, as by bolts 26. The extremities of these arms are inclined upwardly and lie within the channels or pockets formed by enclosing or casing members 27 secured as by bolts 28 to the cross frame member 29. The frame member is connected at its ends to the side channel members 16, 17, and is curved downwardly to pass beneath the transmission casing 14. Between the arms 25 and the channel members 29 is positioned a rubber pad or cushion 30.

The rear supports are in such close proximity to the neutral axis A B that the movements at these points due to inherent lateral vibrations are very nearly imperceptible and may therefore be accommodated without providing for swinging movements to the extent desirable at the forward points of support. The rear supports shown are so positioned that any oscillations about the axis are substantially in the plane of the arms 25 and are readily permitted by the resilience of the rubber cushions 30. At the same time slight relative movements due to distortion of the frame or swaying of the engine are permitted under resilient restraint.

By locating the opposed surfaces of the members 25 and 27 in inclined positions on opposite sides of the axis of oscillation and substantially in the planes in which oscillations of the members 25 tend to occur it will be seen that I provide for relative movement in accordance with such oscillations in directions parallel to the opposed faces. The movements are therefore accommodated, somewhat in the manner of the rocking of a shaft in a bearing, without material variation in the thickness of pads or blocks 30. Such movements, since they require very little flow or distortion of the rubber, transmit much less force to the frame than would be the case where the surfaces of the supporting members substantially inclined to the direction of oscillation.

The character of the links 18 and their mounting is such that they tend to prevent excessive lateral movement of the engine assembly. I prefer, however, to provide means for definitely limiting and controlling such movement so that it is permitted only to the extent required to accommodate the inherent vibratory movement. This means, in the form illustrated, comprises a brace 50, (Fig. 2), rigidly secured to a bracket 51 on the side frame member 17. This brace projects through an aperture in the crankcase into the interior thereof being surrounded by a packing gland 52. A head 53 on the inner end of the brace engages a lever 54 pivoted at 55 on the interior of the crankcase. The free end of the lever rests upon a cam 56 on a shaft driven by the engine for example, the cam shaft 57. A spring 58 acts against the head 53 to force the brace toward the lever 54 and maintain the parts in engagement.

The secondary inertia forces act at twice crankshaft frequency and are of constant value for a given engine. The amplitude of the resulting vibrations about the neutral axis is substantially constant for all speeds and, in the example illustrated, it amounts to a few thousandths of an inch at the location of the front supports. The brace 50 being situated, as shown, in the vicinity of the front supports, must provide for a swinging movement in accordance with the vibrations. The lever 54 and cam 56 are therefore so proportioned and the cam lobes so positioned that the engine would be caused to move back and forth in exact synchronism with the movements imposed upon it by the unbalanced forces and to the same extent as the amplitude which the vibrations inherently assume. The brace is therefore automatically and periodically adjusted to correspond with the position of the engine vibrating freely in response to the inherent unbalanced forces. Thus, while preventing non-periodic or out-of-phase movements it does not interfere with or restrain the vibratory movements and does not communicate to the frame the energy of such movements.

The number of lobes on cam 56 will depend, of course, upon the speed of the shaft 57. If, as suggested, this be the cam shaft, revolving at half crankshaft speed, then the cam should have four lobes.

I claim:

1. The combination with an engine of the 90° eight-cylinder type having a 180° crankshaft and a supporting frame, said engine and frame constituting members to be connected, of a supporting means for said engine comprising a bar secured at its ends to one of said members and at an intermediate point to the other; said bar being flexible in the direction in which the engine tends to vibrate due to inherent unbalanced forces and substantially rigid in other directions.

2. The combination with an engine subject to inherent unbalanced forces tending to cause vibration about a fixed axis and a supporting frame, said engine and frame constituting members to be connected, of supporting means comprising a bar secured at its ends to one of said members and at an intermediate point to the other, said bar being flexible in a direction to permit relatively free movement of the engine about said axis in response to said vibration and substantially rigid in other directions.

3. The combination with an engine subject to inherent unbalanced forces tending to cause vibration about a fixed axis and a supporting frame of connecting means between said engine and frame comprising bars arranged longitudinally of the engine said bars being located in planes containing said axis and flexible in directions normal to said planes.

4. The combination with automobile power plant assembly comprising an engine of the 90° eight-cylinder type having a 180° crankshaft, a transmission casing and a chassis frame of supports for the front end of the assembly comprising links arranged to permit the assembly to swing about an axis above the engine and inclined downwardly to the rear, and rear supports adjacent to said axis comprising arms extending laterally from the transmission casing and cushioned connections for said arms adapted to permit movement about said axis.

5. The combination with an automobile power plant comprising a 90° eight-cylinder engine having a 180° crankshaft, a transmission casing and a chassis frame having side frame members of rear supports for said power plant comprising a transverse frame member at said casing connecting said side members and cushioned elements on each side of said casing supported upon said transverse member.

6. The combination with an engine and a supporting frame therefor of means connecting the engine and frame comprising a bar at each side of the engine, each bar being laterally flexible but substantially rigid in other directions, the ends of said bars being secured to the frame and an intermediate portion to the engine, the bars being positioned in intersecting planes whereby flexibility is permitted about the axis at the intersection of said planes.

7. The combination with an engine and a frame constituting members to be connected in such manner as to permit relative movement between said engine and frame of supporting means comprising a resilient bar having its ends connected to one of said members and an intermediate portion connected to the other member, said bar being formed and positioned to be flexible in the direction to permit such relative movement but substantially rigid in the direction in which the weight of said members acts.

8. The combination with an engine and a frame constituting members to be connected, said engine being subject to vibrations about a fixed axis, of means for supporting the engine from the frame at points remote from said axis comprising a laterally flexible element having its ends connected to one of said members and an intermediate portion connected to the other, said element positioned to act as a substantially rigid support for the weight of the engine and to permit oscillation of the engine relative to the frame about said axis.

9. In combination, a supporting automobile frame, an engine assembly subject to forces tending to cause oscillations about an axis inclined downwardly from the front to rear of the assembly, resilient supporting means between the front of the assembly and the frame providing limited freedom of oscillation about said axis, and rear supporting means arranged on opposite sides of said axis, said rear supporting means including rubber cushions positioned at such angles that oscillations about said axis occur substantially in the plane of said cushions.

10. In combination, a supporting frame, an engine and a transmission casing at one end of the engine constituting a power unit, said unit subjected during operation to forces tending to cause oscillations about an axis inclined downwardly to the transmission end, resilient means for supporting the other end of the unit providing limited movement of the unit relative to the frame about said axis and means for supporting the transmission end of the unit, said last-mentioned means comprising a resilient support on each side of the transmission casing, each support including a pad of rubber inclined upwardly and outwardly from the casing with the said pad extending substantially in the direction in which said oscillations tend to occur.

11. In combination, an automobile chassis frame, an engine subjected during operation to forces tending to cause oscillations of said engine about a longitudinal axis, resilient supporting means for the front of the engine, providing for limited movement of the engine relative to the frame in the direction of such oscillations, and supporting means for the rear of the engine comprising supports on opposite sides of said axis, each support including rigid members connected respectively to the engine and frame and a rubber cushion between said members, the opposed surfaces of said members and said cushions being inclined to the horizontal and extending substantially in the direction in which said oscillations tend to occur.

CALEB E. SUMMERS.